April 28, 1942.  W. J. ELLISON  2,280,903
SEPARATION AND RECOVERY OF SHORT FIBROUS ASBESTOS
FROM GRANULAR ASBESTOS-BEARING ROCK
Filed Jan. 23, 1940  3 Sheets-Sheet 3

Inventor
Wilfred James Ellison
by
Edwards, Bruer & Pal
Attorney

Patented Apr. 28, 1942

2,280,903

UNITED STATES PATENT OFFICE 2,280,903

SEPARATION AND RECOVERY OF SHORT FIBROUS ASBESTOS FROM GRANULAR ASBESTOS-BEARING ROCK

Wilfred James Ellison, Norden, Rochdale, England, assignor to Turner and Newall Limited, Spotland, Rochdale, England, a British company Application January 23, 1940, Serial No. 315,192
In Great Britain November 14, 1939

6 Claims. (Cl. 209—2)

This invention relates to the separation and recovery of short fibrous asbestos from asbestos-bearing rock which has been reduced to the form of small granules. The processes generally in use for recovering asbestos fibre from the rock at asbestos mines include some form of crushing or beating operation or both to separate as far as possible the fibre from the rock, to reduce the dimensions of the rock portions, and to open out the fibre portions. A screening operation is generally employed after the crushing or beating operations to remove the broken rock and fibrous portions below a certain size, determined by the mesh of the screen used. An air lift may then be used to remove the loose asbestos fibre from the rock in the parts of the product which have passed over the screen.

The larger rock elements which pass over the screen with the fibre during the screening operation are left behind by the air lift which recovers the fibre, and are collected and subjected to a further complete stage of operations as indicated, but with the size of the screen apertures reduced. The stages may be repeated until such a small size of screen aperture is used that it is not possible by known methods to obtain a profitable recovery of asbestos by applying further treatment to the small elements which are removed by the screen. The method and apparatus forming the subject of the present invention render it possible to carry still further the recovery of asbestos from the granular complex formed by the reduction processes referred to above.

The small elements forming the complex are made up of the following ingredients:

(a) Rock granules which contain asbestos in the form of minute veins.

(b) Rock granules which contain no asbestos.

(c) Hard granules which consist of bundles of asbestos.

(d) Short asbestos fibres in various stages of separation from each other.

Known methods of fibre recovery by means of crushing or beating, screening and air lifting become increasingly difficult and inefficient as the elements comprising the complex become less in size.

Gravity crushing by rolls, balls or rods is inefficient when operating on small elements because, firstly, the hard particles readily flow away from the crushing surfaces and, secondly, the shock of crushing is absorbed and rendered ineffective by the presence of large numbers of superimposed granules between the crushing surfaces. It is not advisable to avoid these disadvantages by passing only a thin layer of granules between the crushing surfaces because gravity crushing of thin layers of small elements causes the fibres to be cut and damaged by the surrounding rock particles and also because, for the process to be economical, high outputs are necessary to counteract the low value of the asbestos fibre which is being recovered.

If screening is employed as a means of fibre separation after the existing methods of crushing or beating, the separation is inefficient because the hard barren rock particles which have evaded size reduction are accepted by the screen and pass over with the asbestos fibre which has been given greater volume by opening during the rock reduction process.

The usual process of fibre separation by air lifting becomes less selective as the particles to be left behind become smaller and therefore lighter, because it becomes impossible so to arrange the strength and disposition of the air current that fibre is lifted without taking the smaller granules of rock with it. Furthermore, the hard bundles of asbestos fibre which have evaded the previous operation of crushing or beating are liable to be left behind to be discarded with the barren rock particles.

The invention has for its object to provide efficient means for reducing the size of rock granules which contain asbestos so that the fibre is released therefrom without damage, while at the same time reducing the size of rock granules which contain no asbestos without damage to contiguous asbestos fibre. Other objects are to provide efficient means firstly for opening, without damage, any small hard bundles of asbestos fibre which are present; secondly for completing the opening, without damage, of short asbestos fibres which are already partially opened; and thirdly for carrying forward, without damage, asbestos fibres which are already sufficiently opened when such fibres are present alongside other elements which are being treated. The invention also provides means for separating and recovering asbestos fibre from granules of rock of a wide range of sizes.

These objects are attained according to the present invention mainly by effecting the reduction of the rock granules, and the opening of the asbestos, while it is moving freely in air in the course of passage through high speed beater mechanism which effects the reduction and opening by impact only and not by a grinding or crushing action.

The invention is illustrated by way of example in the accompanying drawings in which.

Figure 1:
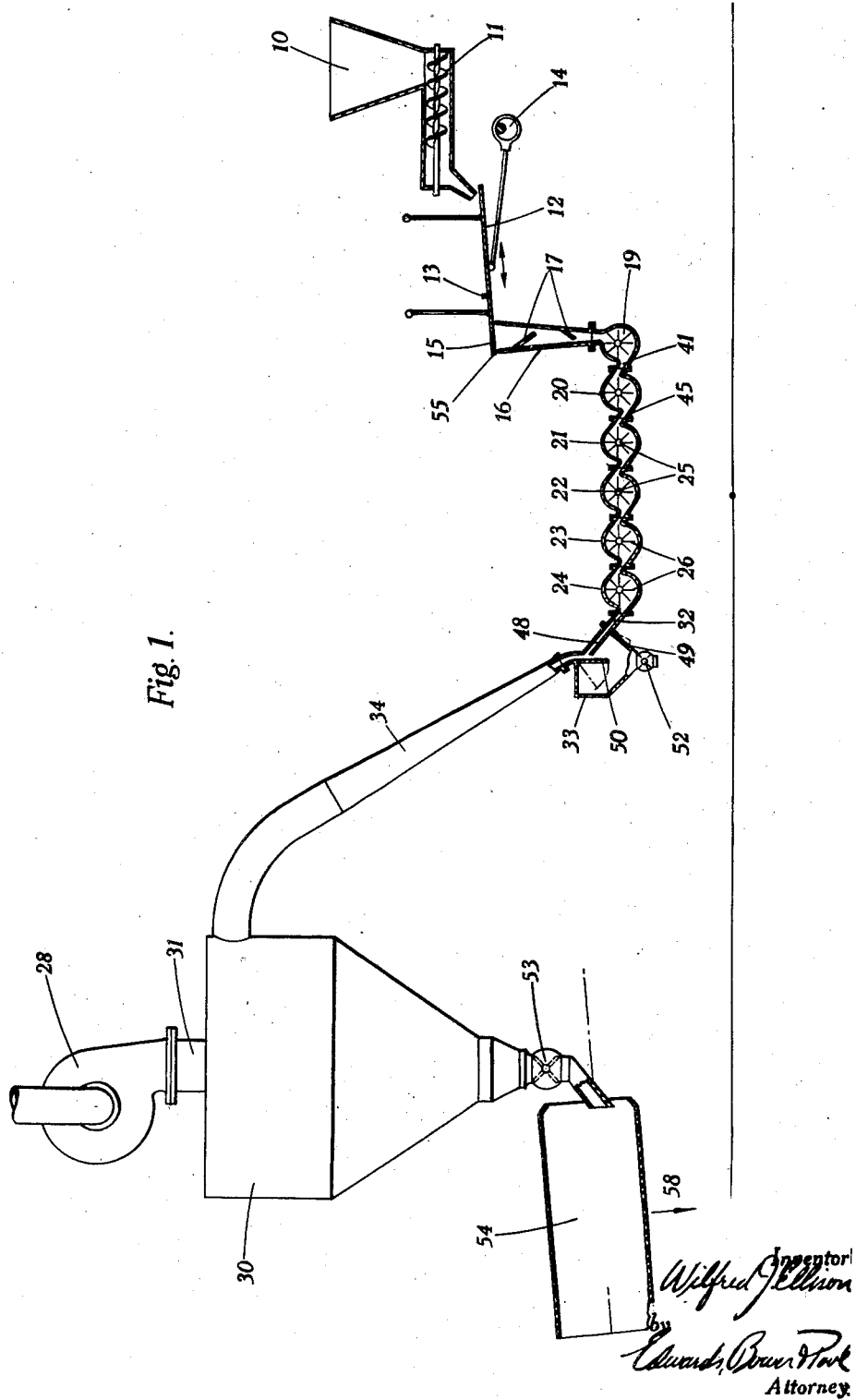
Figure 1 is a diagram of a complete installation.
Figure 2:
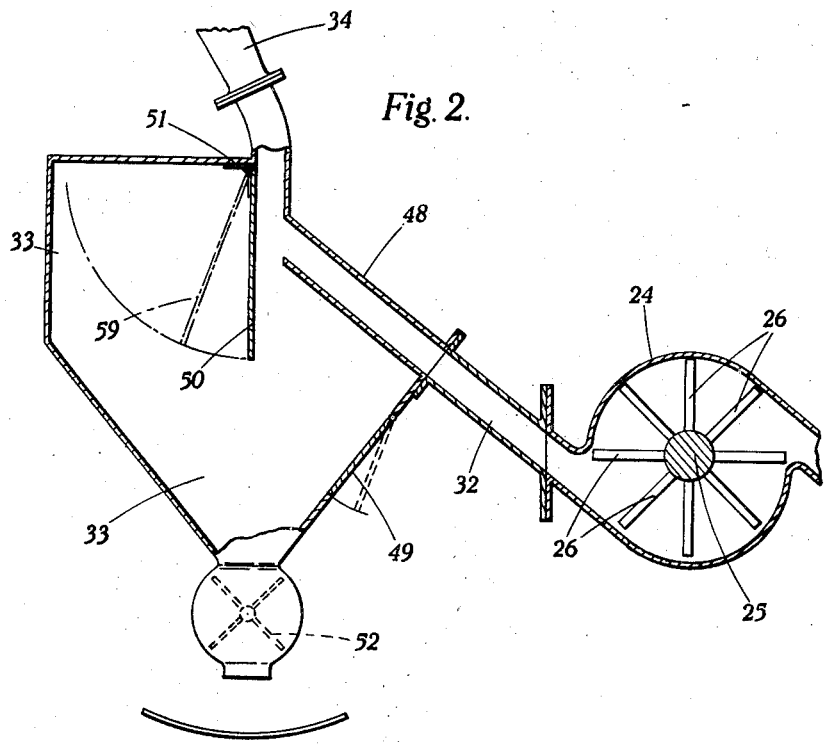
Figure 2 is a diagram on a larger scale showing one form of separator for the rock granules.

Referring first to Figure 1, the complex asbestos material to be treated, in the form of granules or sand containing a percentage of asbestos fibres, is charged into the hopper 10 of a feeder of a known type which delivers it by a worm feed 11 to a solid shaking table 12 fitted with a spreading device such as chevrons or ledges as at 13 to distribute the granules evenly over the full width of the surface of the table. The shaking motion may be imparted to the table by a link from an eccentric 14. A portion 15 of the table at the lower end is perforated, the perforations being provided by a wire screen for example of, say, 1/4" aperture. Underneath the perforated portion of the shaking table is the mouth of a chamber 16 which is provided with baffles 17.

The lower end of the chamber is also open and is suitably fastened to the inlet of a feeder casing 19, which discharges into the first of a series of interconnected treatment casings. Five treatment casings 20 to 24 are shown in Figure 1, but the assembly may consist of any number from one upwards.

Figure 4:
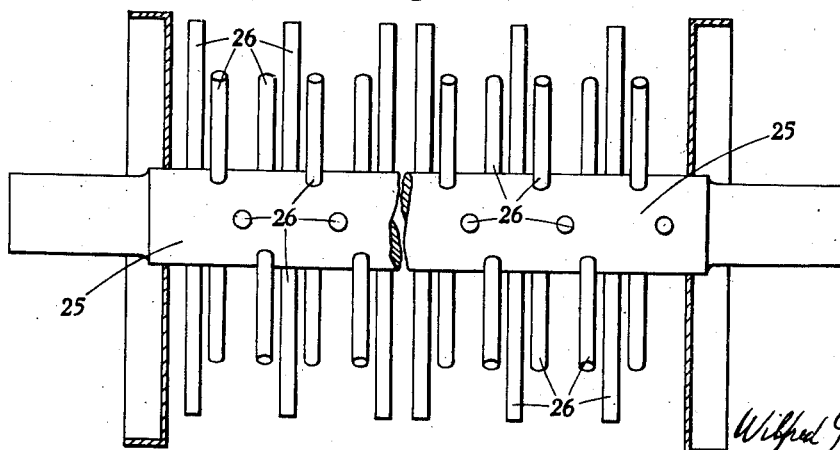
Figure 4 is a partial elevation of one of the rotary beaters used in the apparatus.
Figure 3:
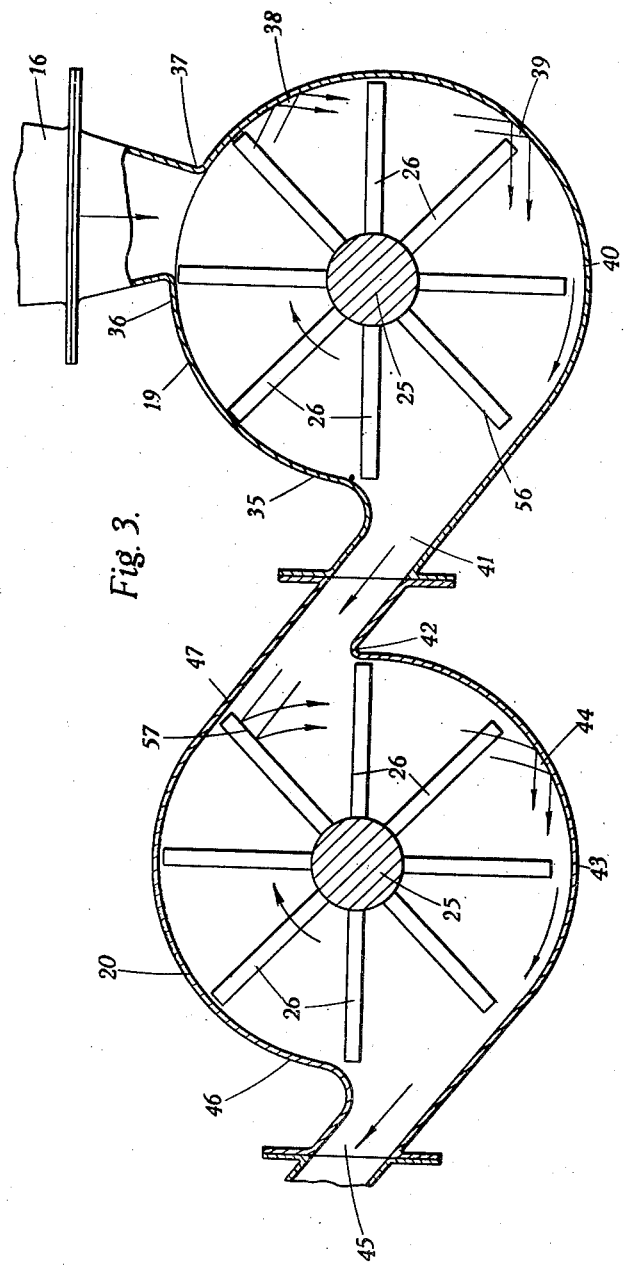
Figure 3 is a view on a larger scale of two of the elements shown in Figure 1.

Inside all the casings are beaters constructed as shown in Figures 3 and 4. The beater arms or rods 26 fastened to the shaft 25 may be round or of any shape in section. They may be solid or articulated at one or several points. For some abrasive materials it may be preferable to have the rods in two pieces comprising a steel arm permanently fastened to the shaft and a detachable end for replacement when wear has taken place.

In the arrangement shown in Figures 3 and 4, the rods are set at an angle of 45° to each other and they are disposed spirally round the shaft. For some materials it may be preferable that the rods should be spaced at an angular relation to one another circumferentially and they are not necessarily disposed spirally around the shaft. Many possible alternative arrangements could be devised by any competent designer to suit particular circumstances. Similarly, the rods are not necessarily disposed truly radially to the shaft although this has been shown as generally the most convenient arrangement.

The beater shafts 25 normally revolve at high speed, say at 2000 revolutions per minute, but the number of revolutions is adjusted to give the desired degree of treatment according to the hardness and character of the material. The most favourable results for any granular complex to be treated will be found to occur somewhere in the range of speeds between 750 and 2500 revolutions per minute. With certain classes of complex materials it may be an advantage to increase the beater speeds in the successive casings 20 to 24. An air current is passed through the machine from the inlet to the outlet, and is induced by an exhausting fan 28 placed at some point beyond the outlet of the machine. In the arrangement shown in Figure 1, the fan draws the air from the last beater casing 24 through a duct 32, a baffle box 33, a conduit 34, and a centrifugal separator 30, whose outlet 31 is connected to the fan casing. The air speed is adjusted to suit the material being dealt with and the degree of opening required. The correct air speed for any complex material will be found to be between 1500 and 5000 feet per minute at the point of entry into each of the treatment casings 20 to 24.

Each rotary beater may be about one foot in diameter and of considerably greater length, say four feet long, but these dimensions are only indicated by way of example. The beaters rotate in the directions shown by arrows within metal casings 19 and 20 to 24 whose inner surfaces are smooth at all points. The feed casing 19 which is first in the series is shown connected to the lower end of the chamber 16 to receive the granular material which falls through this chamber. The profile of the casing 19 is arranged so that there is a bare clearance of say 1/8" between the rod ends 26 of the beater and the casing in the zone from 35 to 36, Figure 3. At the air-cutting point 37, the clearance may be very small, say 1/32". From the point 37 along the surface where the points 38, 39, 40 are marked, the casing recedes from the path described by the rod ends until a maximum clearance of say 7/8" is reached at the point 40. From this point the casing slightly approaches the path of the rod ends until it again recedes to form the lower tangential line of the throat 41.

The treatment casings 20 to 24, the first of which is shown in Figure 3, are alike. The lower wall of each treatment casing, starting from the air-cutting point 42 which may be 1/32" from the path of the rod ends, gradually recedes from the beater until the clearance reaches a maximum of, say, 7/8" at the point 43. From this point the casing approaches slightly the path of the rod ends until it recedes again to form the lower tangential line of the throat 45. The upper profile of each treatment casing is arranged to have a clearance of, say, 1/8" at the point 46 and this clearance persists along the upper zone up to the point 47 until the casing recedes to form the upper tangential line of the throat 41.

The casings may be arranged with a horizontal disposition to one another as shown or they may be vertically over one another or at any angle.

At the discharge of the last casing 24 is an extension conduit 32 communicating with the corresponding conduit 48 of the rock separator box 33. This box is air-tight except that provision is made by an adjustable door 49 for the entry of a small quantity of air. A sheet metal baffle 50, hinged at 51 and adjustable as to angle, is set opposite the throat extension 48. A constantly air-sealed discharge valve is provided at 52. The discharge from the top of the separator box 33 is via the conduit 34 leading tangentially into the head of the centrifugal separator or settler 30, which may be a centrifuge of the well known cyclone type. At the base of the centrifuge is a rotary valve 53 with its outlet connected to the feed end of the rotary screen 54.

In the operation of the plant, the granular material to be treated is loaded into the hopper 10, preferably after the finer elements have been removed by previous screening over a small mesh screen of, say, .03" aperture. This pre-screening reduces the tonnage to be dealt with by the recovery unit while the discards through the screen are not of much value.

The material is propelled from the hopper 10 in a constant stream by the screw 11 on to the shaking table 12 which may be actuated so as to make about 200 oscillations per minute. Spreading arrangements such as ledges 13 ensure that a level thin stream of the granules is passed to the screen 15. The width of the stream is slightly less than the width of the casings 19 to 24 which may be, for example, four feet wide. Normally, the whole of the material passes through the screen but any undesirably large elements of rock, large pieces of uncrushed asbestos agglomerates, or pieces of foreign matter such as nails, bolts or wood chippings, are shaken over the end of the screen at 55 and are thus prevented from entering and damaging the beater units.

The accepted elements pass down the chamber 16 in a wide, thin stream and fall into the feeder casing 19. The baffles 17 prevent any material from being thrown back by the feeder beater in casing 19.

The granular material is impelled partly by gravity and partly by the air current entering the machine through and around the screen 15, and is precipitated into the path of the feeder beater in casing 19. The close spacing of the rods on the beater causes the material to be propelled with great force against the casing in the region 38. The material rebounds from the casing as indicated by arrows and a further blow is inflicted by the rods resulting in a further impact with the casing in the region 39. The rebounding material is then scooped up and swept along by the beater until it is thrown clear of the rods at approximately the point 56. Its discharge is assisted by the air current, the material travelling at high speed up the passage 41 to be met in the region 57 by the oncoming rods of the beater in casing 20. The force of the resulting blow inflicted by the rods is caused by two factors, namely the speed of the air-borne particles and the speed of the rods in the opposite direction at the point of impact. After impact the particles are thrown against the smooth face of the casing at or about the region 44. The succeeding particles emerging from the passage 41 are vigorously intermixed with those leaving the rods in the region 57. The material rebounding from the casing at 44 is swept along by the beater rods to the passage 45 where it is either fed to further treatment units as in Figure 1 or is discharged directly through the final outlet 32 to the separator box 33.

Since the material is fed in the form of a thin stream extending for the full width of the machine, it follows that the rapid succession of finely distributed blows, combined with the sudden arrests brought about by the casing surfaces, ensures that there is no possibility of material passing through the machine untreated. Furthermore, since the extent of the treatment depends on the momentum with which the material is struck by the rods and which is possesses when arrested by the casing, it follows that the larger and heavier particles such as rock granules are treated more forcibly than the lighter particles such as fibre. In this way the machine imparts discriminating treatment according to the needs of the various elements in the complex.

There is no risk of damage to the delicate fibre elements because of this discriminating treatment and also because at no point does the treatment depend on simultaneous action on the elements by two relatively moving metal surfaces. For this same reason, the small granules of rock are not inextricably mixed with the fibrous elements. Attrition brought out by impacts among the particles themselves takes place during the vigorous intermixing at the entry of each beater casing in the region 57, Figure 3. This attrition increases the bulk or degree of opening of the fibrous elements without damaging them. The stream of particles and air emerging from the passage 41 ensures that the material passing from about the region 57 to 44 is kept clear of the air-cutting edge 42 so that damage to fibre by contact with that edge is avoided.

Due to the high velocity at which the material passes through the machine, a sufficiently high output can be maintained with a small quantity of material undergoing treatment at one time. In this way the possibility of material escaping treatment by protection from surrounding elements is reduced to a minimum.

As it emerges from the final throat 32 the complex consists of the following ingredients: (a) rock granules which have resisted reduction in size; (b) rock granules which have been reduced in size; (c) asbestos which has been liberated from surrounding rock and which has been increased in bulk by beating and self-attrition; and (d) asbestos which was in the original complex in an unopened or partially opened condition and which has been increased in bulk by beating and self-attrition.

The complex in this form strikes the baffle plate 50 at high velocity. The arrest and change of direction results in a loss of velocity, and the heavier particles in ingredients (a) and (b) above fall by gravity into the box 33 to be discarded at the valve 52. If the plate 50 is set forward towards the mouth of the passage 48, the loss of velocity occasioned by impact is not so great and there is less discard into the box 33. If, on the other hand, the plate 50 is set further away from the mouth of the passage 48, as indicated in dotted lines at 59, there is greater loss in velocity and more of the solid air-borne elements are discarded. It is possible, therefore, so to adjust the angle of the plate that substantially those elements only which are required to be discarded are separated from the stream of ingredients.

The remaining fibre and light particles of rock pass up the passage 34. The fibre is deposited into the centrifuge 30 and the air leaves the stream at 31 taking with it the lightest particles of rock in the form of dust. Separation at this point is effective because of the well-divided condition of the material entering the centrifuge.

The deposited material discharged by the rotary valve 53 and delivered to the rotary screen 54 still contains some granules which were too light to be deposited in the box 33 and too heavy to be taken away by the air stream at 31. These granules are screened out by the rotary screen 54 and deposited at 58. This screening is effective because of the open nature of the fibrous material. The recovered fibre leaves the screen at 60.

The apertures of screen 54 may be of the same size as those utilised in the final milling process which rejected the complex before treatment by the recovery unit described above. As all the granular material has previously passed through this size of aperture and most of it has, in the recovery unit, been reduced in size, its rejection is effected without difficulty. Fibre is not rejected by this aperture since its bulk has been increased in the recovery unit.

I claim:

1. In an apparatus for recovering fibrous asbestos from asbestos-bearing rock in granular form, the combination of means for forming the granular material into a thin substantially uniform stream, high-speed rotary beating means adapted to strike said stream and feed it forward, means for feeding said stream to said beating means, at least one treatment casing arranged in series with said beating means, each of said treatment casings containing a high speed rotary beater comprising a plurality of beater arms projecting from a shaft, inlet and outlet passages for each of said treatment casings so disposed that the material impelled by the beater in the preceding casing is directed against the beater arms in the next casing in a region where they are moving against the path of the incoming material at high velocity, means independent of said beater means for setting up a continuous airstream adapted to pick up and bear said material through said casings; and baffle means arranged in the path of said airborne material after it leaves said treatment casings and adapted to remove the heavier particles from the asbestos.

2. In an apparatus for recovering fibrous asbestos from asbestos-bearing rock in granular form, the combination of means for forming the granular material into a thin substantially uniform stream, high-speed rotary beating means adapted to strike said stream and feed it forward, means for feeding said stream to said beating means, at least one treatment casing arranged in series with said beating means, means separate from said beating means for setting up a current of air through said casings to carry said material with it, each of said treatment casings containing a high speed rotary beater comprising a plurality of beater arms projecting from a shaft, inlet and outlet passages for each of said treatment casings so disposed that the material impelled by the beater in the preceding casing is directed against the beater arms in the next casing in a region where they are moving against the path of the incoming material at high velocity, and baffle means arranged beyond said casings in the path of said air current and adapted to deflect downwardly from said air current the heavier particles, while allowing the asbestos to be carried onwards by said current.

3. In an apparatus for recovering fibrous asbestos from asbestos-bearing rock in granular form, the combination of means for forming the granular material into a thin substantially uniform stream, a plurality of treatment casings arranged in series and having imperforate walls, rotary beating means within said walls of each of said treatment casings, means for feeding said stream to the first of said treatment casings, means for conveying said material from said first casing through the other casings in series including means setting up an airstream adapted to bear said material through said casings, each of said treatment casings containing a high speed rotary beater comprising a plurality of beater arms projecting from a shaft, inlet and outlet passages for each of said treatment casings so disposed that the material impelled by the beater in the preceding casing is directed against the beater arms in the next casing in a region where they are moving against the path of the incoming material at high velocity, and baffle means comprising a chamber containing a plate adjustable in its angular relation to the path of movement of the material as it enters said chamber.

4. In an apparatus for recovering fibrous asbestos from asbestos-bearing rock in granular form, the combination of means for forming the granular material into a thin substantially uniform stream, a chute down which said stream can fall under gravity, means for feeding said stream to said chute, high-speed rotary beating means at the base of said chute adapted to strike said stream and feed it forward, means separate from said beating means for setting up an airstream carrying said material from said beating means, and at least one additional treatment casing arranged in series with said beating means and having imperforate walls forming a passage for said airstream, each of said treatment casings containing a high speed rotary beater comprising a plurality of beater arms projecting from a shaft, inlet and outlet passages for each of said treatment casings so disposed that the material impelled by the beater in the preceding casing is directed against the beater arms in the next casing in a region where they are moving against the path of the incoming material at high velocity.

5. In an apparatus for recovering fibrous asbestos from asbestos-bearing rock in granular form, the combination of a jigging screen, means for feeding the granular material to said screen, high-speed rotary beating means located beneath said screen and adapted to strike material passing through said screen and to feed it forward, means separate from said beating means for setting up an airstream carrying said material from said beating means, and at least one additional treatment casing arranged in series with said beating means, each of said treatment casings containing a high speed rotary beater comprising a plurality of beater arms projecting from a shaft, inlet and outlet passages for each of said treatment casings so disposed that the material impelled by the beater in the preceding casing is directed against the beater arms in the next casing in a region where they are moving against the path of the incoming material at high velocity.

6. In an apparatus for recovering fibrous asbestos from asbestos-bearing rock in granular form, the combination of a plurality of treatment casings, high-speed rotary beating means in each casing, connecting passages between the successive casings so arranged that the material impelled by one beater enters the next casing in a direction opposed to the path of movement of the beater arms at the entrance point, means for feeding said granular material under gravity into the first of said casings, means separate from said beating means for setting up an airstream carrying said material from said beating means; and means for separating heavier particles from asbestos in the material leaving the last of said casings, each of said beating means being operative both to act by impact on the material entering the casing, and to assist in impelling the material from that casing into the next beater casing.

WILFRED J. ELLISON.